United States Patent
Yamagishi

(10) Patent No.: US 9,319,327 B2
(45) Date of Patent: Apr. 19, 2016

(54) PACKET TRANSMISSION METHOD, PACKET TRANSMISSION APPARATUS, AND STORAGE MEDIUM

(71) Applicant: FUJITSU LIMITED, Kawasaki-shi, Kanagawa (JP)

(72) Inventor: Yuichi Yamagishi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/289,981

(22) Filed: May 29, 2014

(65) Prior Publication Data

US 2014/0369196 A1   Dec. 18, 2014

(30) Foreign Application Priority Data

Jun. 17, 2013   (JP) .................................. 2013-126925

(51) Int. Cl.
| | |
|---|---|
| *H04L 12/28* | (2006.01) |
| *H04L 12/56* | (2006.01) |
| *H04J 3/16* | (2006.01) |
| *H04L 12/851* | (2013.01) |

(52) U.S. Cl.
CPC .................................. *H04L 47/2441* (2013.01)

(58) Field of Classification Search
CPC ............ H04L 47/2441; H04L 47/2433; H04L 69/324; H04L 12/56; H04L 12/28; H04L 49/9094; H04L 47/10; H04L 29/08
USPC ...................................................... 370/235
See application file for complete search history.

(56) References Cited

U.S. PATENT DOCUMENTS

| | | | | |
|---|---|---|---|---|
| 8,693,491 | B2 * | 4/2014 | Yamagishi ..................... | 370/429 |
| 2002/0087716 | A1 * | 7/2002 | Mustafa ........................ | 709/236 |
| 2003/0103503 | A1 * | 6/2003 | Dubuc et al. .................. | 370/392 |
| 2004/0156313 | A1 * | 8/2004 | Hofmeister et al. .......... | 370/229 |
| 2005/0286559 | A1 * | 12/2005 | Miernik et al. ............... | 370/468 |
| 2006/0209726 | A1 | 9/2006 | Kawasumi | |
| 2008/0267198 | A1 * | 10/2008 | Sajassi .......................... | 370/401 |

FOREIGN PATENT DOCUMENTS

| | | |
|---|---|---|
| JP | 2006-261825 | 9/2006 |
| JP | 2010-252376 | 11/2010 |
| JP | 2012-044344 | 3/2012 |

* cited by examiner

*Primary Examiner* — Edan Orgad
*Assistant Examiner* — Vanneilian Lalchinthang
(74) *Attorney, Agent, or Firm* — Staas & Halsey LLP

(57) ABSTRACT

A packet transmission method includes receiving a packet having a first service class; determining a maximum transfer band of the first service class, based on maximum transfer band information for each of a plurality of service classes of each of a plurality of computers; determining a transfer band of the first service class, based on traffic amount information for each of the plurality of service classes; transferring the received packet in the first service class, when the transfer band is smaller than the maximum transfer band of the first service class; determining whether a second service class includes a free band, based on the maximum transfer band information, when the transfer band of the first service class is not smaller than the maximum transfer band; and transferring the received packet in the second service class, when it is determined that the second service class includes the free band.

17 Claims, 14 Drawing Sheets

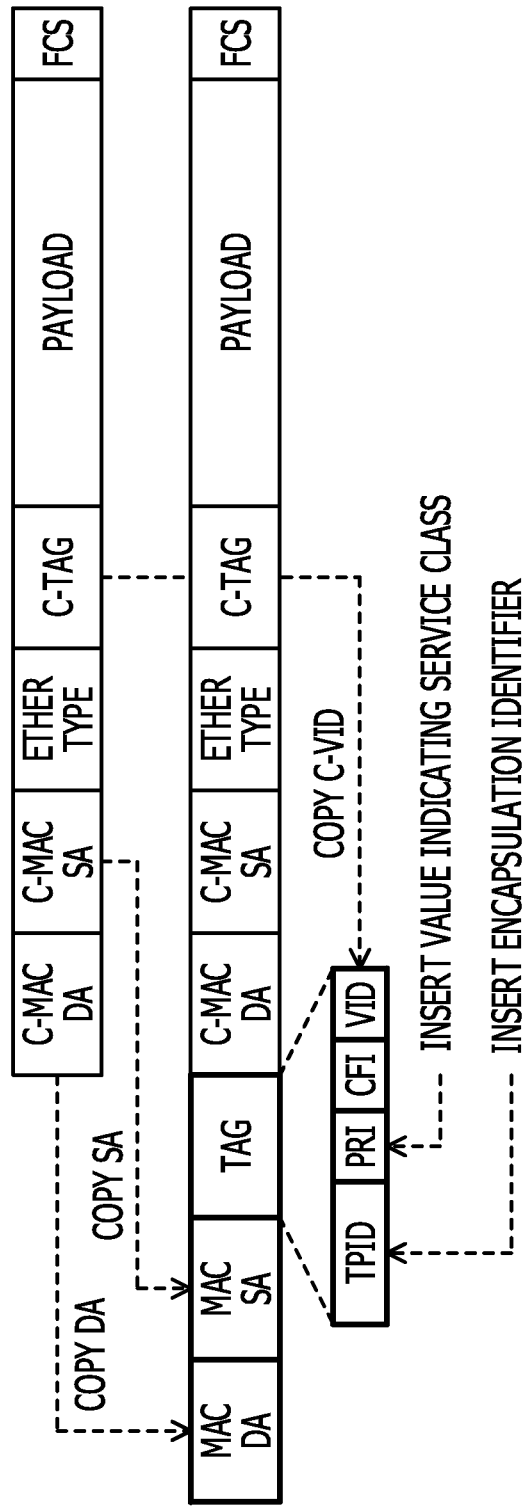

FIG. 7

ALLOCATION OF MAXIMUM TRANSFER BAND

|  | NODE #1 | NODE #2 | NODE #3 |
|---|---|---|---|
| SERVICE CLASS QUEUE #1 | 0.8G | 0.2G | 1.0G |
| SERVICE CLASS QUEUE #2 | 1.0G | 1.0G | 1.0G |
| SERVICE CLASS QUEUE #3 | 1.0G | 1.0G | 1.0G |
| SERVICE CLASS QUEUE #4 | 5.2G | 5.8G | 5.0G |

FIG. 8

INPUT AND OUTPUT TRAFFIC

|  | NODE #1 | | NODE #2 | | NODE #3 | |
| --- | --- | --- | --- | --- | --- | --- |
|  | Downlink INPUT | Uplink OUTPUT | Downlink INPUT | Uplink OUTPUT | Downlink INPUT | Uplink OUTPUT |
| SERVICE CLASS QUEUE #1 | 0.8G | 0.8G | 0.0G | 0.8G | 1.0G | 1.8G |
| SERVICE CLASS QUEUE #2 | 1.0G | 1.0G | 0.0G | 1.0G | 1.0G | 2.0G |
| SERVICE CLASS QUEUE #3 | 1.0G | 1.0G | 0.0G | 1.0G | 2.0G | 3.0G |
| SERVICE CLASS QUEUE #4 | 0.0G | 0.0G | 0.0G | 0.0G | 0.0G | 0.0G |

FIG. 9

INPUT AND OUTPUT TRAFFIC WHEN MOBILE TERMINAL MOVES

|  | NODE #1 | | NODE #2 | | NODE #3 | |
| --- | --- | --- | --- | --- | --- | --- |
|  | Downlink INPUT | Uplink OUTPUT | Downlink INPUT | Uplink OUTPUT | Downlink INPUT | Uplink OUTPUT |
| SERVICE CLASS QUEUE #1 | 0.8G → 1.0G | 0.8G | 0.0G | 0.8G → 1.0G | 1.0G → 0.8G | 1.8G |
| SERVICE CLASS QUEUE #2 | 1.0G | 1.0G | 0.0G | 1.0G | 1.0G | 2.0G |
| SERVICE CLASS QUEUE #3 | 1.0G | 1.0G | 0.0G | 1.0G | 2.0G | 3.0G |
| SERVICE CLASS QUEUE #4 | 0.0G | 0.0G → 0.2G | 0.0G | 0.0G | 0.0G | 0.0G |

PACKET TRANSMISSION METHOD, PACKET TRANSMISSION APPARATUS, AND STORAGE MEDIUM

CROSS-REFERENCE TO RELATED APPLICATION

This application is based upon and claims the benefit of priority of the prior Japanese Patent Application No. 2013-126925, filed on Jun. 17, 2013, the entire contents of which are incorporated herein by reference.

FIELD

The embodiment discussed herein is related to a packet transmission method, a packet transmission apparatus, and a storage medium.

BACKGROUND

When designing a network band, a service class is set in accordance with the priority order of assumed traffic. Also, in designing a network band, band allocation to each node and each service class and band control policy setting are systematically performed in accordance with the assumed input traffic amount. Related art is disclosed, for example, in Japanese Laid-open Patent Publication No. 2012-44344, and the like.

In traffic a transmission source of which is a mobile terminal, however, the mobile terminal serving as the transmission source moves. Thus, prediction of the traffic is difficult, and systematic band allocation and operation in accordance with a band control policy are difficult. More specifically, for example, there is the following problem.

FIG. 1 is a view illustrating an example network system. In a lower part of FIG. 1, a node #A, a node #B, and a node #C of nodes forming the network system are illustrated. One port of the node #A is blocked in order not to form a loop, and traffic flows in the direction from the node #A to the node #C.

Each of the node #A, the node #B, and the node #C accommodates traffic of a mobile terminal via a base station (not illustrated) or the like. Maximum transfer bands of 0.8 Gbps, 1.0 Gbps, and 2.0 Gbps are allocated to the node #A, the node #B, and the node #C, respectively, for a predetermined service class. The maximum transfer band corresponds to a peak information rate (PIR).

For example, the node #A, the node #B, and the node #C receive, as inputs, traffic of 0.8 Gbps, traffic of 0.2 Gbps, and traffic of 1.0 Gbps which join together, respectively from accommodated mobile terminals, and the output traffic amount of the node #C is 2.0 Gbps in total.

Then, when the traffic of 0.2 Gbps, which has been input to the node #B, is input to the node #A because the mobile terminal accommodated in the node #B moves, the input traffic of the node #A is 0.8 Gbps+0.2 Gbps=1.0 Gbps. The maximum transfer band of the node #A is 0.8 Gbps, and excessive traffic over the maximum transfer band of the node #A, that is, traffic of 0.2 Gbps, is discarded by the node #A.

The output traffic amount of the node #C after the mobile terminal moves, on the other hand, is 0.8 Gbps+0 Gbps+1.0 Gbps=1.8 Gbps. That is, in the example illustrated in FIG. 1, the output traffic amount of the node #C is 1.8 Gbps and, despite that the output traffic amount is less than the maximum transfer band (2.0 Gbps), a packet discard occurs in the node #A and efficiency in band use is reduced. The above-described problem might occur regardless of topology of, for example, a ring-type network, a tree-type network, a mesh-type network, and the like.

SUMMARY

According to an aspect of the invention, a packet transmission method executed by a computer among a plurality of computers in a network, the transmission method includes receiving a packet having a first service class; determining a maximum transfer band of the first service class, the maximum transfer band indicating an upper limit of a transfer band, based on maximum transfer band information for each of a plurality of service classes of each of the plurality of computers; determining a transfer band of the first service class, based on traffic amount information for each of a plurality of service classes of each of the plurality of computers; transferring the received packet in the first service class, when the transfer band of the first service class is smaller than the maximum transfer band of the first service class; determining whether a second service class, different from the first service class, includes a free band, based on the maximum transfer band information, when the transfer band of the first service class is not smaller than the maximum transfer band of the first service class; and transferring the received packet in the second service class, when it is determined that the second service class includes the free band.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4A is a diagram illustrating an example of formats of a C-TAG frame complying with the IEEE802.1Q standard before and after encapsulation performed by an input side encapsulation processing section;

FIG. 7 is a table illustrating band control setting for a ring of 10 Gbps in the network illustrated in FIG. 6;

FIG. 8 is a table illustrating an example of an input and output traffic amount in the ring of 10 Gbps before a terminal group moves;

FIG. 9 is a table illustrating an example of the input and output traffic amount in the ring of 10 Gbps after the terminal group moves;

DESCRIPTION OF EMBODIMENT

Figure 1:
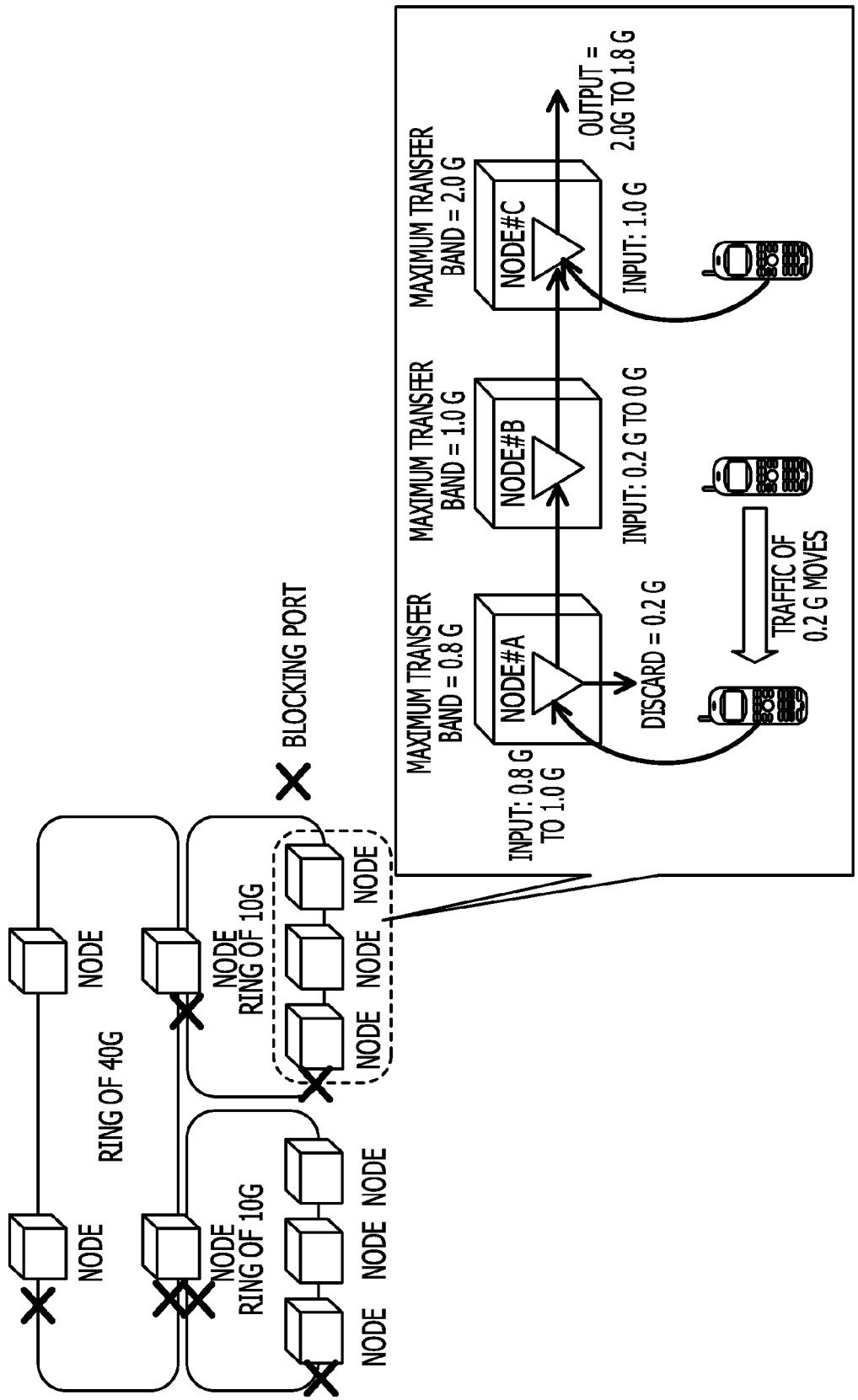
FIG. 1 is a view illustrating an example network system.

Hereinafter, an embodiment will be described with reference to the accompanying drawings. The configuration of the following embodiment is merely an illustrative example and the present disclosure is not limited to the configuration of the embodiment.

When designing of the band of a network, if a service class is defined depending on the type of a packet, information of the service class is given to the header of the packet by any one of the nodes in the network. In a first embodiment, the term "packet" is an Ethernet (registered trademark) frame. Note that a packet is not limited to an Ethernet frame. A predetermined data block used for communication of an Ethernet frame, a multi-protocol label switching (MPLS) packet, or the like, is herein referred to as a "packet".

Service classes are portions of traffic into which the traffic is divided by type, in accordance with an application, a protocol, or the like. There is a priority order set for the service classes, and a packet of a higher priority service class is output from a queue prior to other service classes. For example, a voice packet is classified into a highest priority service class. The information of a service class is stored, for example, in a field of priority in a virtual local area network (VLAN) tag of an Ethernet frame. The service class to which a packet belongs is determined by, for example, an edge node, or the like, which accommodates traffic of a mobile terminal, and the information of the service class is given to the packet by the edge node, or the like.

In the first embodiment, when a received packet is not transferable in the corresponding service class, a node transfers the received packet in another service class having a free band. In this case, the node encapsulates the received packet by a header including the information of the another service class. The case where a received packet is not transferable in the corresponding service class is, for example, a case where the speed (band) of a packet input to the queue of the corresponding service class is equal to or higher than the speed (band) of a packet output from the queue of the corresponding service class. As another example, the case where a received packet is not transferable in the corresponding service class is a case where the received packet is not stored in the queue of the corresponding service class. More specifically, the case where a received packet is not transferable in the corresponding service class is a case where the queue of the corresponding service class has already reached a maximum queue length, or the case where a received packet is not transferable in the corresponding service class is a case where, when the received packet is stored in the queue, the queue length reaches the maximum queue length.

The encapsulated packet is directly sent to the node of the subsequent stage. In the node of the subsequent stage, when the received packet is encapsulated, it is determined whether or not the received packet is transferable in the service class before the packet was encapsulated. If the received packet is transferable in the service class before the packet was encapsulated, the node of the subsequent stage deencapsulates the received packet and transfers the received packet in the service class before the received packet was encapsulated.

In the first embodiment, if a packet is not transferable in the corresponding service class, the packet is transferred in another service class having a free band, and thus, packet discard may be reduced. In the first embodiment, an excessive band in the network is utilized to increase efficiency in band use. In the first embodiment, changes in input traffic amount due to mobile traffic, such as traffic of a mobile terminal and the like, may be flexibly dealt with.

Figure 2:
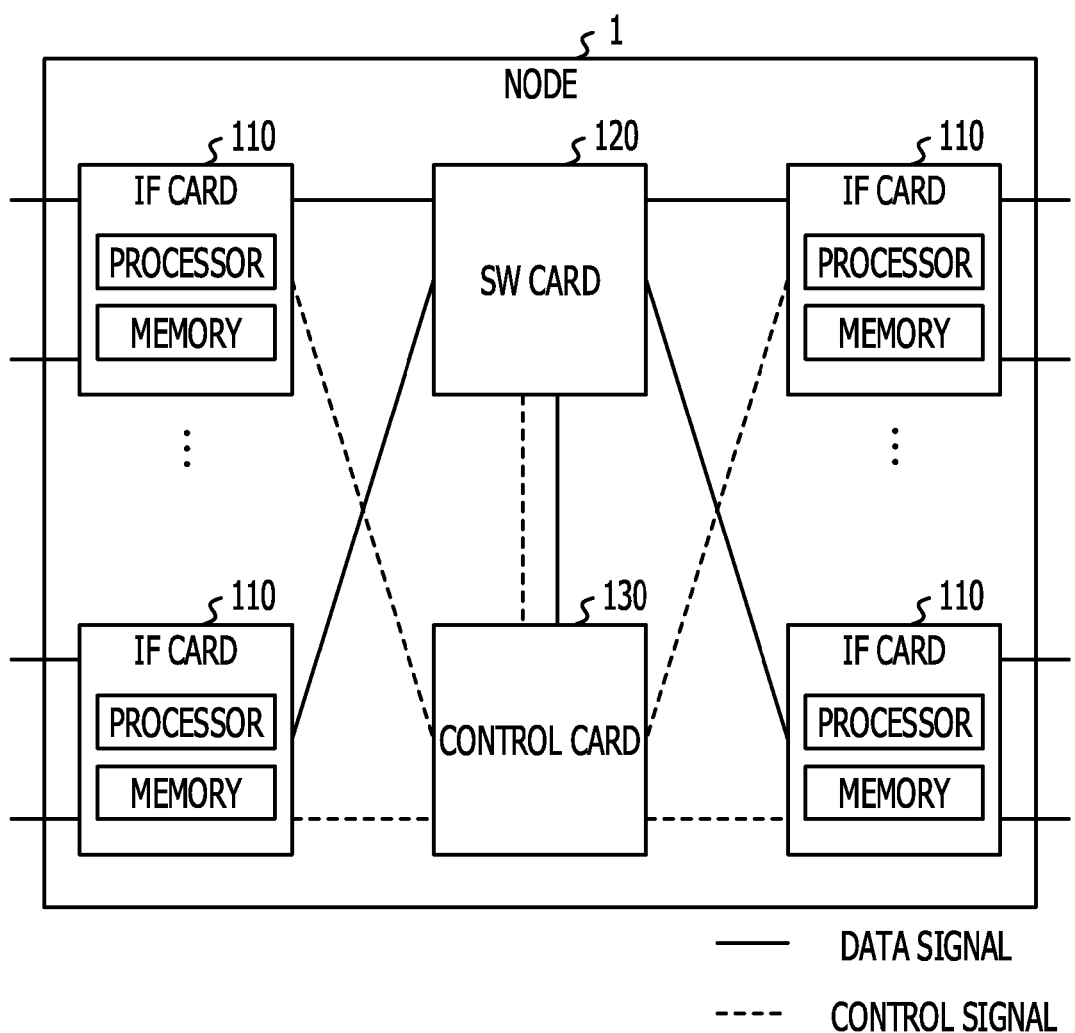
FIG. 2 is a diagram illustrating an example hardware configuration of a node.

FIG. 2 is a diagram illustrating an example hardware configuration of a node 1. The node 1 is a packet transmission apparatus, such as a layer 2 switch, a layer 3 switch, and the like. The node 1 includes a plurality of IF cards 110, a SW card 120 configured to relay a packet between the IF cards 110, and a control card 130 configured to control each of the cards of the node 1.

Each of the IF cards 110 includes a processor, a memory, and a circuit, such as, a field-programmable gate array (FPGA), which is not illustrated. The processor of the IF card is, for example, a network processor. Each of the SW card 120 and the control card 130 includes a processor and a memory, which are not illustrated. The processor of the control card 130 is, for example, a central processing unit (CPU).

Figure 3:
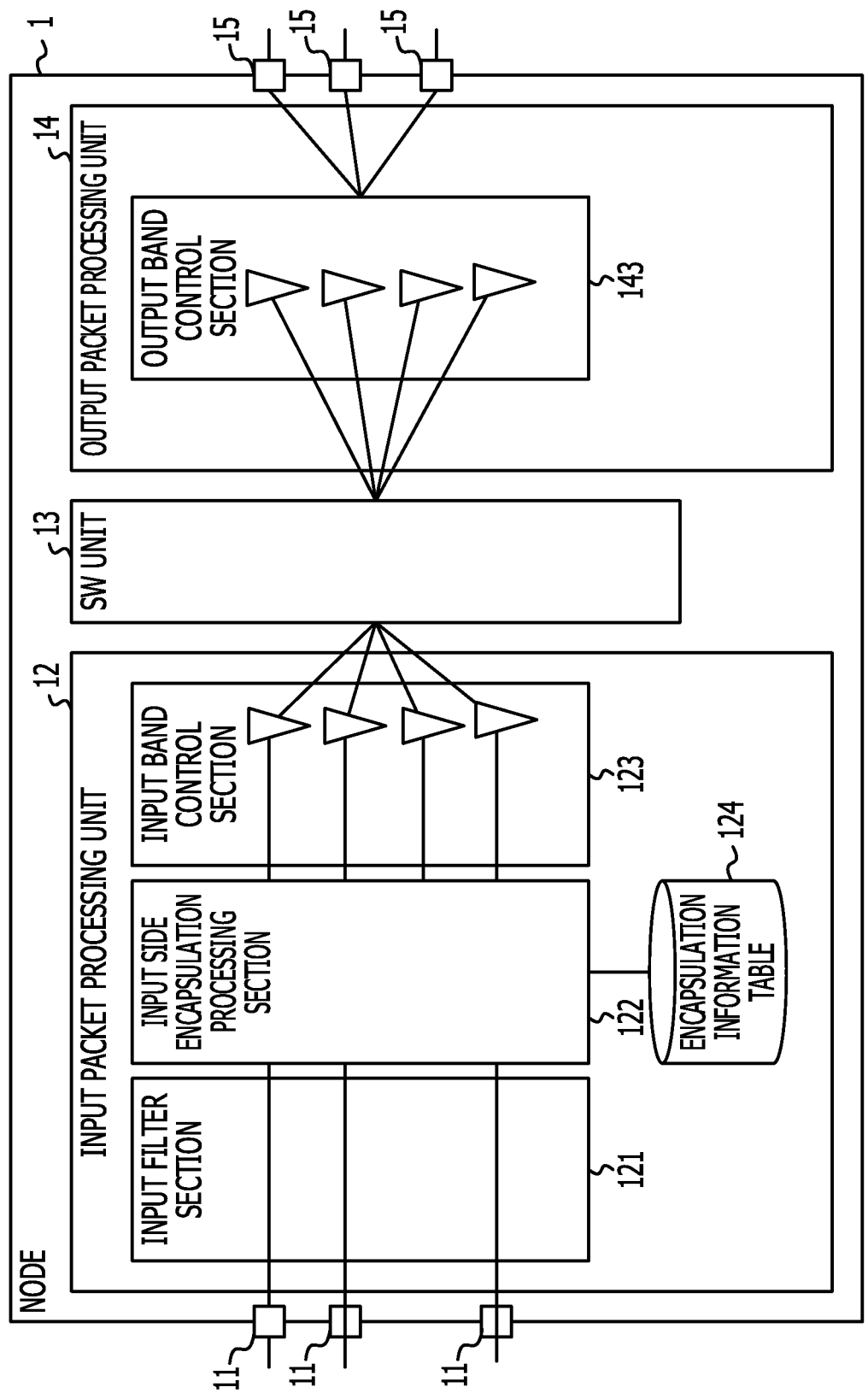
FIG. 3 is a diagram illustrating an example functional block of a node.

FIG. 3 is a diagram illustrating an example functional block of the node 1. The node 1 includes an input packet processing unit 12, a SW unit 13, and an output packet processing unit 14. Each of the input packet processing unit 12 and the output packet processing unit 14 corresponds to an associated one of functional blocks of the IF cards 110. For the IF cards 110, processing at the input side of the node 1 and processing at the output side of the node 1 may be performed in different cards, and may be performed in the same card. Although the node 1 includes a plurality of input packet processing units 12 and a plurality of output packet processing units 14 in accordance with the number of the mounted IF cards 110, FIG. 3 illustrates a single input packet processing unit 12 and a single output packet processing unit 14 for convenience. The SW unit 13 corresponds to the SW card 120.

The input packet processing unit 12 includes an input filter section 121, an input side encapsulation processing section 122, an input band control section 123, and an encapsulation information table 124. The input filter section 121, the input side encapsulation processing section 122, and the input band control section 123 correspond, for example, to the FPGAs. As another option, each of the input filter section 121, the input side encapsulation processing section 122, and the input band control section 123 corresponds to processing performed by executing a predetermined program stored in the memory by the processor of the corresponding IF card 110.

A packet is input to the input packet processing unit 12 from an input port 11. The packet input from the input port 11 will be hereinafter referred to as an "input packet". In the input packet, the information of a service class is stored in the header thereof by another node. The input packet is input to the input filter section 121.

The input filter section 121 determines the service class, based on the header of the input packet. The input filter section 121 may be configured to store the information of the service class in the header of the input packet in accordance with a network policy. Next, the input packet is input to the input side encapsulation processing section 122. The input filter section 121 is an example of a "determination section".

The input side encapsulation processing section 122 performs encapsulation or deencapsulation of the input packet in accordance with the state of the queue of each service class. More specifically, the input side encapsulation processing section 122 performs the following processing. The queue is provided in the input band control section 123, which will be described later.

The input side encapsulation processing section 122 determines, using information stored in the encapsulation information table 124, whether or not the input packet is encapsulated. Whether or not the input packet is encapsulated is determinable based on whether or not a value stored in a predetermined field in the header of the input packet is encapsulation identification information. The predetermined field is, for example, a tag protocol identifier (TPID) field of a VLAN tag of an Ethernet frame. The encapsulation information table 124 is created in a storage area in the memory of the corresponding IF card 110 and stores a value of the encapsulation identification information. The encapsulation identification information has a value corresponding to the size of a field in which the encapsulation identification information is stored.

If the input packet is not encapsulated, the input side encapsulation processing section 122 determines whether or not the input packet is transferable in the service class of the input packet determined by the input filter section 121.

Whether or not the input packet is transferable in the service class is determined based on the relationship between the transfer band of traffic input to the queue of the service class and the maximum transfer band (PIR) of the queue of the service class. For example, the IF card 110 includes a flow rate measuring section (not illustrated) configured to measure the transfer band of input traffic in a predetermined cycle for each packet type or each packet flow. The input side encapsulation processing section 122 tabulates the transfer band of input traffic for types or flows of packets classified into a service class to calculate the transfer band of traffic input to the service class. For the transfer band of traffic input to the queue of each service class, when the transfer band of traffic input to the queue of the corresponding service class is equal to or more than the maximum transfer band (PIR) of the queue of the service class, it is determined that the input packet is not transferable in the service band. When the transfer band of traffic input to the queue of the service class is less than the maximum transfer band (PIR) of the queue of the service class, it is determined that the input packet is transferable in the service class. Whether or not the input packet is transferable in the service class may be determined, using a threshold, which is a smaller value than the maximum transfer band, based on the relationship between the transfer band of the traffic input to the queue of the service class and the threshold of the queue of the service class.

Whether or not the input packet is transferable in the service class may be determined based on the relationship between the queue length of each service class and the packet length of the input packet. A maximum queue length is set for each queue. For example, when a value obtained by adding the packet length of the input packet to the queue length of the queue is less than the maximum queue length, it is determined that the input packet is transferable in the service class. For example, when a value obtained by adding the packet length of the input packet to the queue length of the queue exceeds the maximum queue length (maximum transfer band), or when the queue length has already reached the maximum queue length, it is determined that the input packet is not storable in the queue.

Whether or not the input packet is transferable in the service class is not limited to the foregoing and, for example, a predetermined threshold, which is a smaller value than the maximum queue length, for the queue length may be used. Specifically, for example, when a value obtained by adding the packet length of the input packet to the queue length of the queue does not exceed the predetermined value, it is determined that the input packet is transferable in the service class.

For example, when the value obtained by adding the packet length of the input packet to the queue length of the queue exceeds the predetermined value, or when the queue length of the queue has already reached the predetermined threshold, it is determined that the input packet is not transferable in the service class.

When the input packet is transferable in the service class, the input side encapsulation processing section 122 outputs the input packet to the input band control section 123 without encapsulating the input packet. The input packet is stored in the queue of the service class in the header by the input band control section 123.

When the input packet is not transferable in the service class, the input side encapsulation processing section 122 retrieves another service class in which the input packet is transferable, that is, another service class having a free band. Another service class having a free band is, for example, the queue of a service class having a free band that is equal to or more than an excessive band over the maximum transfer band of the queue of the service class of the input packet. The another service class having a free band is retrieved, for example, from service classes with lower priority than the priority of a service class determined by the input filter section 121. Note that the another service class having a free band is not limited to the foregoing. The queue length and maximum queue length of each queue are recorded in the memory of the corresponding IF card 110. The input side encapsulation processing section 122 reads out the queue length and maximum queue length of each queue from the corresponding memory.

When the queue of the service class having a free band is detected, the input side encapsulation processing section 122 encapsulates the input packet using an encapsulation header including the information of the detected service class. Specific encapsulation processing will be described later. The encapsulated input packet is input to the input band control section 123 and is stored in the queue of the service class in the encapsulation header by the input band control section 123.

When a service class having a free band is not detected, the input side encapsulation processing section 122 discards the input packet because there is no service class in which the input packet is transferable.

When the input packet is encapsulated, the input side encapsulation processing section 122 determines whether or not the input packet is to be deencapsulated. Whether or not the input packet is to be deencapsulated is performed based on whether or not the input packet is transferable in a service class in an original header of the input packet.

When the input packet is transferable in the service class in the original header of the input packet, the input side encapsulation processing section 122 deencapsulates the input packet and outputs the deencapsulated input packet to the input band control section 123. The input band control section 123 stores the deencapsulated input packet to the queue of the service class in the original header.

When the input packet is not transferable in the service class in the original header of the input packet, the input side encapsulation processing section 122 retrieves a service class in which the input packet is transferable. Thereafter, similar processing to processing performed in the case of a packet which is not encapsulated. The input side encapsulation processing section 122 is an example of an "encapsulation processing section".

The input band control section 123 includes a queue. A service class is allocated to each queue. The queue is a first in first out (FIFO) queue. The queue is created in a temporary storage area of the memory of the corresponding IF card 110. Allocation of the service class and maximum queue length of each queue is set, for example, by a network administrator, and the setting is input to the corresponding IF card 110 via the control card 130 and reflected to the memory of the IF card 110.

The input band control section 123 stores the input packet in the corresponding queue in accordance with the information of the service class stored in the header of the input packet. When the input packet is encapsulated, the input band control section 123 refers to the outmost encapsulation header (see, for example, FIGS. 4A and 4B, which will be described later).

The input band control section 123 reads out the input packet from each queue in the order corresponding to the priority order of the service classes of queues and outputs the input packet to the SW unit 13. The input band control section 123 is an example of a "transmission section".

The SW unit 13 determines the IF card 110 and the port of a transfer destination of the input packet in accordance with the information of the header of the input packet, and outputs the input packet to the output packet processing unit 14 corresponding to the IF card 110 of the transfer destination. The packet transferred to the output packet processing unit 14 serving as a transfer destination by the SW unit 13 will be hereinafter referred to as an output packet.

The output packet processing unit 14 includes an output band control section 143. The output band control section 143 stores an output packet in a queue of a service class in the header of the output packet. The output band control section 143 outputs the output packet in accordance with the priority order of the service classes of queues. When the output packet is encapsulated, the output band control section 143 processes the output packet in accordance with the information of the outmost encapsulation header of the output packet.

FIG. 4A is a diagram illustrating an example of formats of a C-TAG frame complying with the Institute of Electrical and Electronics Engineers (IEEE) 802.1Q standard before and after encapsulation performed by the input side encapsulation processing section 122. The IEEE802.1Q C-TAG frame is the format of a packet of a user of a carrier which owns the network to which the node 1 belongs. In FIG. 4A, the upper illustrates the format of the IEEE802.1Q C-TAG frame before being encapsulated and the lower illustrates the format of the IEEE802.1Q C-TAG frame after being encapsulated.

The information of a service class is stored in a field of the priority order in the VLAN tag ("C-TAG" in FIG. 4A) in the frame before encapsulation is performed.

The encapsulation header includes destination MAC address, source MAC address, and VLAN tag fields. The destination MAC address and source MAC address of the original header are copied and stored in the destination MAC address and source MAC address of the encapsulation header.

The VLAN tag in the encapsulation header has a size of 4 bytes, which is the same size as that of the VLAN tag in the original header, and includes TPID, priority order ("PRI" in FIG. 4A), canonical format indicator (CFI), and VLAN ID ("VID" in FIG. 4A) fields. The value of the encapsulation identification information stored in the encapsulation information table 124 is stored in the TPID field of the VLAN tag in the encapsulation header. The priority order field of the VLAN tag is a field in which information indicating a service class is stored. Information indicating a service class detected as a result of retrieving a free band is stored in the priority order field in the encapsulation header. A copy of each of values of CFI and VLAN ID of the VLAN tag in the original header is stored in the CFI and VLAN ID fields of the VLAN tag in the encapsulation header.

Figure 4B:
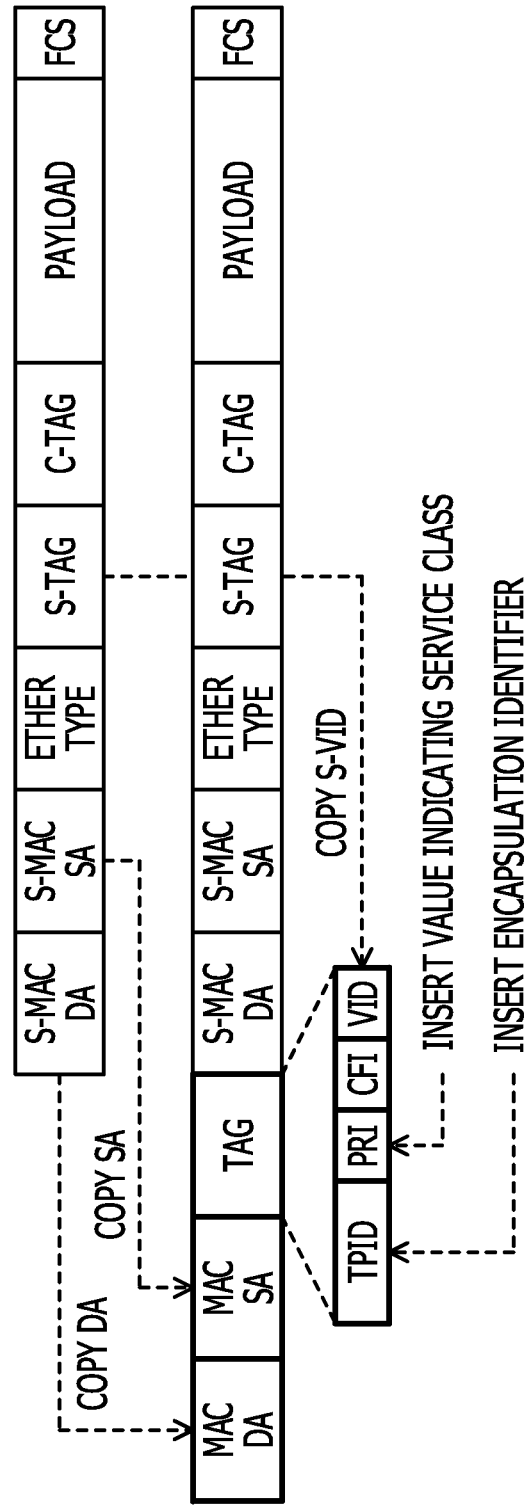
FIG. 4B is a diagram illustrating an example of formats of an S-TAG frame complying with the IEEE802.1ad standard before and after encapsulation performed by the input side encapsulation processing section.

FIG. 4B is a diagram illustrating an example of formats of an S-TAG frame complying with the IEEE802.1ad standard before and after encapsulation performed by the input side encapsulation processing section 122. The IEEE802.1ad S-TAG frame is the format of a packet transferred from or to another carrier. In FIG. 4B, the upper illustrates the format of the IEEE802.1ad S-TAG frame before being encapsulated and the lower illustrates the format of the IEEE802.1ad S-TAG frame after being encapsulated.

The IEEE802.1ad S-TAG frame includes two VLAN tags, that is, an S-TAG used for identifying another carrier and a C-TAG used for identifying a user in the another carrier. In the case of the IEEE802.1ad S-TAG frame, the service class of the original header is a service class indicated by the priority order field in the S-TAG.

The encapsulation header includes destination MAC address, source MAC address, and VLAN tag fields. The destination MAC address and source MAC address of the original header are copied and stored in the destination MAC address and source MAC address of the encapsulation header.

The VLAN tag in the encapsulation header has a size of 4 bytes, which is the same as that of the S-VLAN tag in the original header, and includes TPID, priority order ("PRI" in FIG. 4B), CFI, VLAN ID ("VID" in FIG. 4B) fields. The value of the encapsulation identification information stored in the encapsulation information table 124 is stored in the TPID field of the VLAN tag in the encapsulation header. Information indicating a service class detected as a result of retrieving a free band is stored in the priority order field of the VLAN tag in the encapsulation header. A copy of each of values of CFI and VLAN ID of the S-VLAN tag in the original header is stored in the CFI and VLAN ID fields of the VLAN tag in the encapsulation header.

Figure 5A:
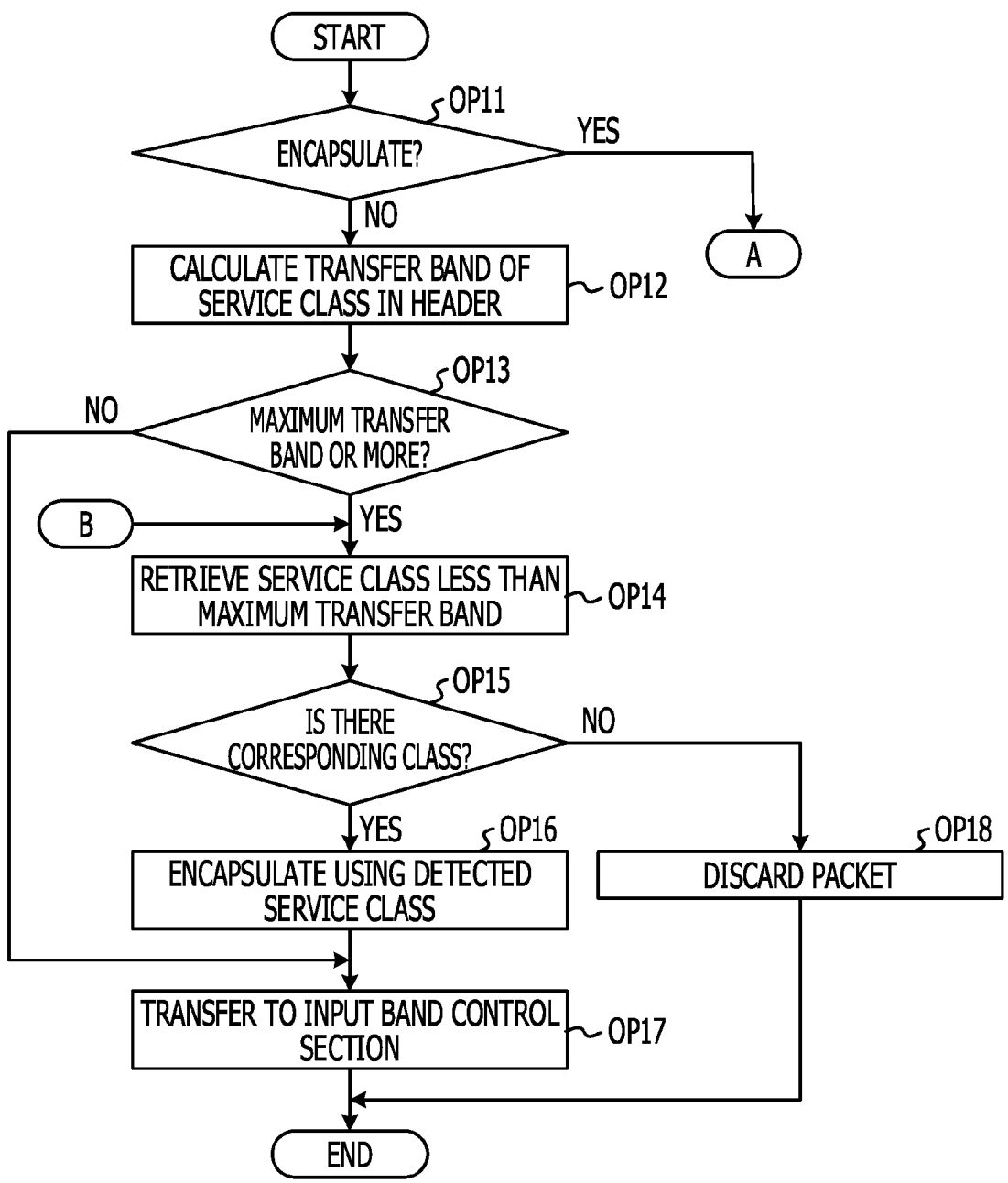
FIG. 5A is a flow chart of processing performed by the input side encapsulation processing section.
Figure 5B:
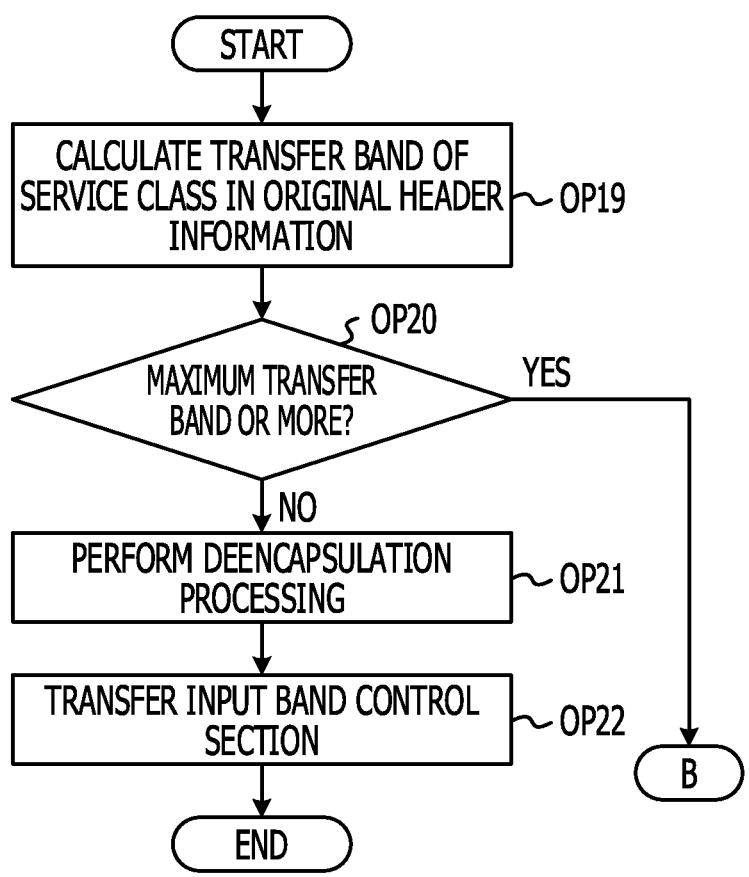
FIG. 5B is a flow chart of processing performed by the input side encapsulation processing section.

Each of FIGS. 5A and 5B is an example of the flow chart of processing performed by the input side encapsulation processing section 122. Processing in the flow chart illustrated in FIGS. 5A and 5B starts, for example, when an input packet is input to the input side encapsulation processing section 122.

In OP11, the input side encapsulation processing section 122 determines whether or not the input packet is encapsulated. This determination is performed, for example, by determining whether or not the value of the TPID field of the VLAN tag in the header of the input packet is the value of the encapsulation identification information stored in the encapsulation information table 124. If the input packet is encapsulated (YES in OP11), the process proceeds to OP19. If the input packet is not encapsulated (NO in OP11), the process proceeds to OP12.

OP12-OP18 are processing performed when the input packet is not encapsulated. OP12 and OP13 are processing performed to determine whether or not the input packet is transferable in a service class in the header of the input packet.

In OP12, the input side encapsulation processing section 122 calculates the transfer band of traffic that is to be input to the queue of the service class in the header of the input packet. The transfer band of the traffic that is to be input to the queue of the service class in the header of the input packet is calculated by tabulating the transfer band of input traffic for each of types or flows of packets included in the service class of the input packet. Then, the process proceeds to OP13.

In OP13, the input side encapsulation processing section 122 determines whether or not the calculated transfer band of the traffic that is to be input to the queue of the service class calculated in OP12 is equal to or more than the maximum transfer band. If the transfer band of the traffic that is to be input to the queue of the service class is equal to or more than the maximum transfer band (YES in OP13), the process proceeds to OP14.

If the transfer band of the traffic that is to be input to the queue of the service class is less than the maximum transfer band (NO in OP13), the process proceeds to OP17. In OP17, the input side encapsulation processing section 122 transfers the input packet to the input band control section 123 without encapsulating the input packet. The input packet is stored in the queue of the service class in the header. Then, the processing illustrated in FIGS. 5A and 5B is ended.

OP14 and OP15 are processing performed to retrieve another service class having a free band when the input packet is not transferable in the service class in the header of the input packet. In OP14, the input side encapsulation processing section 122 retrieves the queue of a service class having a band which is less than the maximum transfer band even after adding thereto an excessive transfer band over the maximum transfer band of the service class in the header of the input packet, that is, a band having a free band.

In OP15, the input side encapsulation processing section 122 determines whether or not there is the queue of a service class having a free band. If there is the queue of the service class having a free band (YES in OP15), the process proceeds to OP16. In OP16, the input side encapsulation processing section 122 encapsulates the input packet using the encapsulation header including the information of the detected service class. Next, in OP17, the input side encapsulation processing section 122 outputs the encapsulates input packet to the input band control section 123. Then, the processing illustrated in FIGS. 5A and 5B is ended. The encapsulated input packet is stored in the queue of the service class in the encapsulation header by the input band control section 123 and is output to the output packet processing unit 14. The encapsulated input packet is output in the service class in the encapsulation header to the node in the subsequent stage via the output packet processing unit 14.

If a plurality of queues of service classes having a free band are detected, for example, the input side encapsulation processing section 122 may select, from the detected service classes, a service class to which the highest priority is given, and encapsulate the input packet. As another option, the input side encapsulation processing section 122 may select the queue of one of the service classes which has the largest free band.

If there is not the queue of a service class having a free band (NO in OP15), the process proceeds to OP18 and, in OP18, the input side encapsulation processing section 122 discards the input packet. Then, the processing illustrated in FIGS. 5A and 5B is ended.

OP19-OP22 are processing performed when the input packet is encapsulated. OP19 and OP20 are processing performed to determine whether or not the input packet is transferable in the service class in the original header of the input packet and whether or not the input packet is to be deencapsulated.

In OP19, the input side encapsulation processing section 122 calculates the transfer band of traffic that is to be input to the queue of the service class in the original header of the input packet. Then, the process proceeds to OP20.

In OP20, the input side encapsulation processing section 122 determines whether or not the transfer band of traffic that is to be input to the queue of the service class calculated in OP19 is equal to or more than the maximum transfer band. If the transfer band of traffic that is to be input to the queue of the service class is equal to or more than the maximum transfer band (YES in OP20), the process proceeds to OP14. Thereafter, the above-described processing of OP14-OP18 is performed, so that the input packet is encapsulated and output to the input band control section 123 or discarded. Then, the processing illustrated in FIGS. 5A and 5B is ended.

If the transfer band of traffic that is to be input to the queue of the service class is less than the maximum transfer band (NO in OP20), the process proceeds to OP21. In OP21, the input packet is transferable in the service class in the original header, and therefore, the input side encapsulation processing section 122 deencapsulates the input packet. Then, the process proceeds to OP22. In OP22, the deencapsulated input packet is output to the input band control section 123. Then, the processing illustrated in FIGS. 5A and 5B is ended. The deencapsulated input packet is stored in the queue of the service class in the original header by the input band control section 123.

The flow chart illustrated in FIGS. 5A and 5B is merely an example and may be modified, as appropriate. For example, the input side encapsulation processing section 122 may calculate, in OP12, the queue length when the input packet is stored, and determine, in OP13, whether or not the calculated queue length is equal to or more than the maximum queue length of the queue of the service class.

Figure 6:
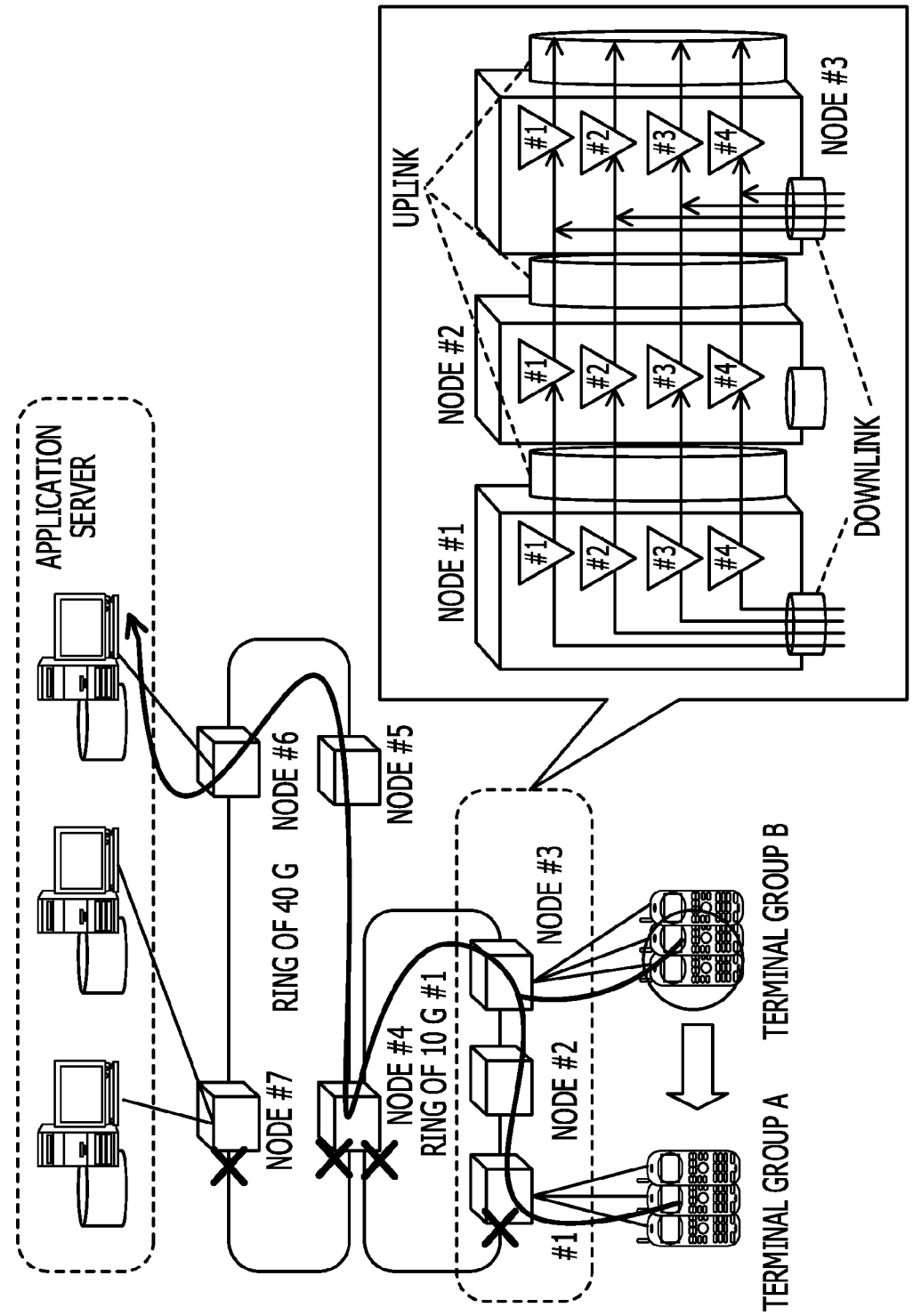
FIG. 6 is a view illustrating an example network system of an operation example.

FIG. 6 is a view illustrating an example network system of an operation example. The network system illustrated in FIG. 6 is a ring-type network system. A node #1, a node #2, a node #3, and a node #4 are connected to one another via a ring having a transfer band of 10 Gbps.

The node #1 accommodates traffic of a terminal group A. The node #3 accommodates traffic of a terminal group B. The node #1, the node #2, and the node #3 transfer input traffic from the terminal group A and the terminal group B to the node #4. The node #4 transfers the traffic transferred from the node #3 to an upper ring of 40 Gbps and to an application server connected to a node #6 or a node #7.

In the network system illustrated in FIG. 6, service classes #1-#4 are defined. Each node has queues allocated to the service classes #1-#4. The priority order is the service class #1> the service class #2> the service class #3> the service class #4.

In the network system illustrated in FIG. 6, a link between the nodes in the direction from the node #1 to the node #2, to the node #3, and to the node #4 is an uplink. A link between each node and the corresponding accommodated terminal is a downlink.

FIG. 7 is a table illustrating band control setting for a ring of 10 Gbps in the network illustrated in FIG. 6. In FIG. 7, for each service class of each node, the upper limit of input traffic from the corresponding accommodated terminal group is indicated.

In the node #1, input traffic is recognized from the terminal groups of 0.8 Gbps, 1.0 Gbps, 1.0 Gbps, and 5.2 Gbps at maximum for the service classes #1, #2, #3, and #4, respectively. In the node #2, input traffic is recognized from the terminal groups of 0.2 Gbps, 1.0 Gbps, 1.0 Gbps, and 5.8 Gbps at maximum for the service classes #1, #2, #3, and #4, respectively. In the node #3, input traffic is recognized from the terminal groups of 1.0 Gbps, 1.0 Gbps, 1.0 Gbps, and 5.0 Gbps at maximum for the service classes #1, #2, #3, and #4, respectively.

That is, the ring of 10 Gbps has a capability of transferring 2.0 Gbps, 3 Gbps, 3 Gbps, and 10 Gbps at maximum to the service classes #1, #2, #3, and #4, respectively, for the node #4. Note that, for the service class #4, the maximum transfer band is 10 Gbps and, when the maximum transfer band is used in the service classes #1-#3, the maximum transfer band is 2.0 Gbps.

FIG. 8 is a table illustrating an example of the input and output traffic amount in the ring of 10 Gbps before a terminal group moves. In the example illustrated in FIG. 8, the "Downlink input" indicates the traffic amount of traffic input from the terminal group accommodated by each node. In the example illustrated in FIG. 8, the "Uplink output" indicates the traffic amount of traffic output from each node in the direction to the node #4.

That is, in the example illustrated in FIG. 8, for each service class, the total sum of the "Downlink input" of each node is the value of the "Uplink output" of the node #3 and thus is the traffic amount of traffic output from the node #3 to the node #4. For example, the service class #1 has the input traffic amounts of 0.8 Gbps, 0 Gbps, and 1.0 Gbps from the terminal groups of the node #1, the node #2, and the node #3, respectively, and the output traffic amount from the node #3 to the node #4 is 1.8 Gbps.

Next, in the network system of the example illustrated in FIG. 6, assume that some terminals (an input traffic amount of 0.2 Gbps) of the terminal group B accommodated in the node #3 have moved to the terminal group A accommodated in the node #1.

FIG. 9 is a table illustrating an example of the input and output traffic amount in the ring of 10 Gbps after the terminal group moves. Since a terminal or terminals corresponding to a traffic amount of 0.2 Gbps have moved from the terminal group B accommodated in the node #3 to the terminal group A accommodated in the node #1, the "Downlink input" of the service class #1 of the node #3 reduces from 1.0 Gbps to 0.8 Gbps. On the other hand, the "Downlink input" of the service class #1 of the node #1 increases from 0.8 Gbps to 1.0 Gbps.

In the node #1, based on FIG. 7, the upper limit of the input traffic amount from the terminal of the service class #1 of the node #1 is 0.8 Gbps. Therefore, it is indicated that the increased traffic of the service class #1, which is 0.2 Gbps, is not transferable in the service class #1 (YES in OP13 in FIG. 5A). In the node #1, a service class having a free band is retrieved (OP14 in FIG. 5A).

In the node #1, the respective upper limits of the input traffic amounts from the terminals of the service classes #2 and #3 are 1.0 Gbps and 1.0 Gbps, based on FIG. 7, and inputs from terminals are 1.0 Gpbs and 1.0 Gpbs, based on FIG. 9. That is, it is indicated that, in the node #1, the service classes #2 and #3 do not have a free band.

On the other hand, in the node #1, the upper limit of the input traffic amount of the service class #4 is 5.2 Gpbs, based on FIG. 7, and an input from a terminal is 0 Gpbs, based on FIG. 9. That is, it is indicated that the service class #4 has a free band.

Therefore, the node #1 encapsulates traffic of 0.2 Gbps which is not transferable in the service class #1 using the encapsulation header including the information of the service class #4 and transfers the traffic to the node #2 (YES in OP15, and OP16 and OP17 in FIG. 5A). That is, the node #1 transfers traffic of 0.8 Gbps in the service class #1 to the node #2. Then, the node #1 transfers traffic of 0.2 Gbps, which is to be originally transferred in the service class #1, in the service class #4 to the node #2. Thus, in the example illustrated in FIG. 9, the "Uplink output" of the service class #1 of the node #1 is 0.8 Gpbs. In the example illustrated in FIG. 9, the "Uplink output" of the service class #4 of the node #1 is changed from 0.0 Gbps to 0.2 Gbps.

Next, a packet of 0.2 Gbps encapsulated using the encapsulation header including the information of the service class #4 is input to the node #2 from the node #1. The node #2 determines, based on the original header of the encapsulated packet, that the input packet is a packet of the service class #1 (YES in OP11 in FIG. 5A). In the node #2, for the service class #1 of the original header, whether or not there is a free band is determined (OP19 and OP20 in FIG. 5B).

In the node #2, the maximum transfer band of the service class #1 is the upper limit of the input traffic from the corresponding accommodated terminal, that is, 0.2 Gpbs+the maximum transfer traffic amount from the node #1, that is, 0.8 Gbps, =1.0 Gbps, based on FIG. 7. Based on the example illustrated in FIG. 9, for the service class #1 of the node #2, the input traffic amount from the corresponding accommodated terminal is 0 Gbps, and the transfer traffic amount from the node #1 is 0.8 Gbps. Therefore, it is indicated that the service class #1 of the node #2 has a free band for the traffic of 0.2 Gbps encapsulated and transferred from the node #1 in the service class #4 (NO in OP20 in FIG. 5B).

Therefore, the traffic of 0.2 Gbps encapsulated using the capsulation header of the service class #4 by the node #1 is deencapsulated by the node #2 and output to the node #3 in the service class #1 (OP21 and OP22 in FIG. 5B). That is, the traffic of 0.8 Gbps transferred from the node #1 in the service class #1 and the traffic of 0.2 Gbps transferred from the node #1 in the service class #4 are transferred from the node #2 to the node #3 in the service class #1. Thus, in the example illustrated in FIG. 9, the "Uplink output" of the service class #1 of the node #2 is changed from 0.8 Gbps to 1.0 Gbps.

For the service class #1, traffic of 1.0 Gbps from the node #2 and traffic of 0.8 Gbps from the accommodated terminal group B are input to the node #3. The traffic from the node #2 is not encapsulated (NO in OP11 in FIG. 5A) and the maximum transfer band of the service class #1 of the node #3 is 2.0 Gbps, based on FIG. 7. Therefore, it is indicated that the service class #1 of the node #3 has a free band for the traffic of 1.8 Gbps (NO in OP12 and OP13 in FIG. 5A). Thus, in the node #3, the traffic input in the service class #1 is not encapsulated and transferred to the node #4 (OP17 in FIG. 5A).

As has been described, in the network system illustrated in FIG. 6, even when the traffic of 0.2 Gbps moves from the node #3 to the accommodated terminal group of the node #1, the traffic of 0.2 Gbps, which has moved, is transferred without being discarded.

In the first embodiment, when an input packet is not transferable in a service class in the header of the input packet, a node encapsulates the input packet with a header including information of another service class having a free band. The encapsulated input packet is stored in a queue of the another service class having a free band and is transferred from the queue. Thus, packet discard may be reduced. Even when traffic is moved by a mobile terminal and a traffic amount exceeding an assume traffic amount at the time of setting of the band of the network is moved, a free band may be effectively used and the moved traffic amount may be flexibly dealt with.

By encapsulating the input packet, the information of a service class in accordance with the policy of the network is maintained in the original header. Thus, a segment where a packet is sorted into a service class which does not comply with the policy of the network may be limited to between nodes where the transfer band of the original service class is deficient, and the policy of the entire network may be maintained.

Figure 10:
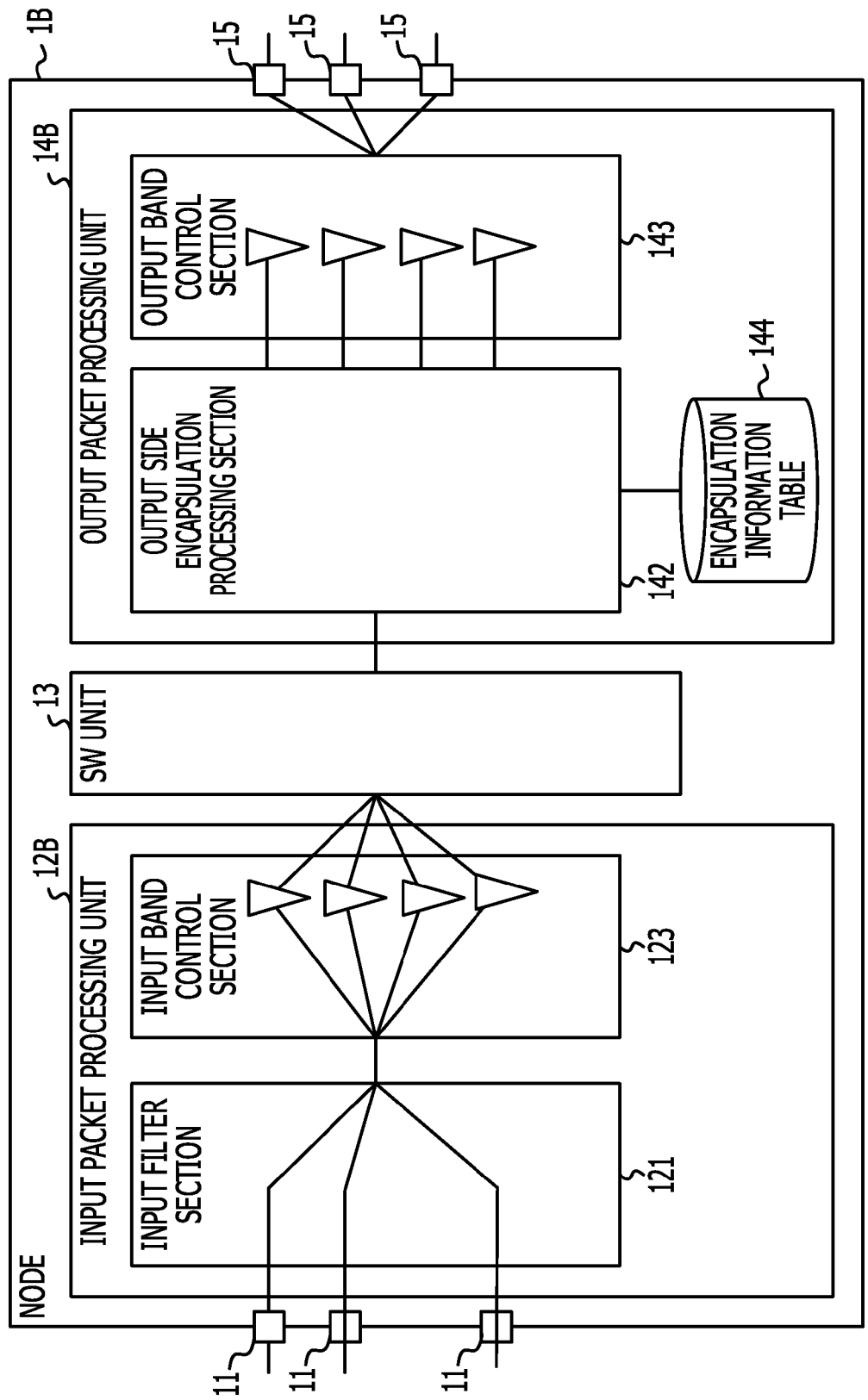
FIG. 10 is a block diagram illustrating a modified example of a first embodiment.

FIG. 10 is a block diagram illustrating a modified example of the first embodiment. In the first embodiment, encapsulation and deencapsulation of the input packet is performed in the input packet processing unit 12. However, encapsulation and deencapsulation of the input packet are not limited thereto and may be performed in the output packet processing unit 14. FIG. 10 illustrates an example functional block of a node 1B when encapsulation and deencapsulation of the input packet are performed in the output packet processing unit 14.

An input packet processing unit 12B of the node 1B includes an input filter section 121 and an input band control section 123. The input packet processing unit 12B of the node 1B includes an output side encapsulation processing section 142, an output band control section 143, and an encapsulation information table 144.

The encapsulation information table 144 stores a value of the encapsulation identification information. The output side encapsulation processing section 142 performs processing, substantially similar to the above-described processing, in which the input side encapsulation processing section 122, the input band control section 123, and the input packet are replaced with the output side encapsulation processing section 142, the output band control section 143, and an output packet.

Figure 11:
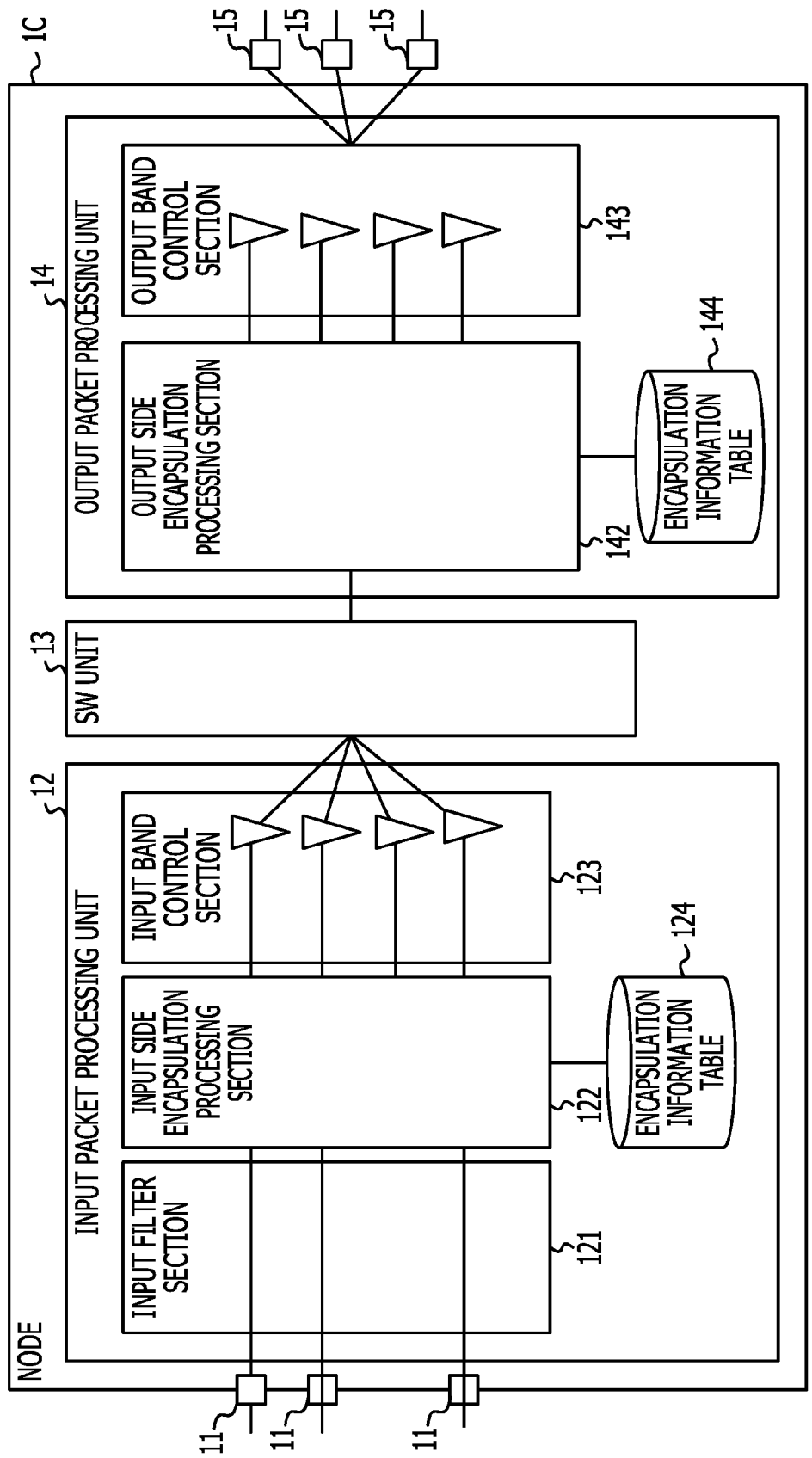
FIG. 11 is a block diagram illustrating another modified example of the first embodiment.

FIG. 11 is a block diagram illustrating another modified example of the first embodiment. Encapsulation and deencapsulation of the input packet may be performed in both of the input packet processing unit 12 and the output packet processing unit 14. FIG. 11 illustrates an example functional block of a node 1C when encapsulation and deencapsulation of the input are performed in both of the input packet processing unit 12 and the output packet processing unit 14.

The input packet processing unit 12 of the node 1C is as described in the first embodiment and includes the input side encapsulation processing section 122. An output packet processing unit 14B of the node 1C is as described in FIG. 11 and includes the output side encapsulation processing section 142.

The state of the transfer band in the input packet processing unit 12 might be different from the state of the transfer band in the output packet processing unit 14. Therefore, encapsulation and deencapsulation of the input packet are performed in both of the input packet processing unit 12 and the output packet processing unit 14, and thereby, band control of each service class may be performed more properly.

The following is another modified example. In the first embodiment, the encapsulated packet is output as being encapsulated, and deencapsulation is performed in the node of the subsequent stage. Instead of this, for example, a processing unit configured to perform deencapsulation may be disposed in the subsequent stage of the input band control section 123 and an encapsulated packet may be deencapsulated and transferred from the queue of each service class. Thus, the processing according to the first embodiment is completed in a single node.

In the first embodiment, a case where a node processes an Ethernet (registered trademark) frame is described, but the technology described in the first embodiment is applicable to a case where a node processes an MPLS packet. In this case, processing performed to encapsulate a packet is different.

Figure 12:
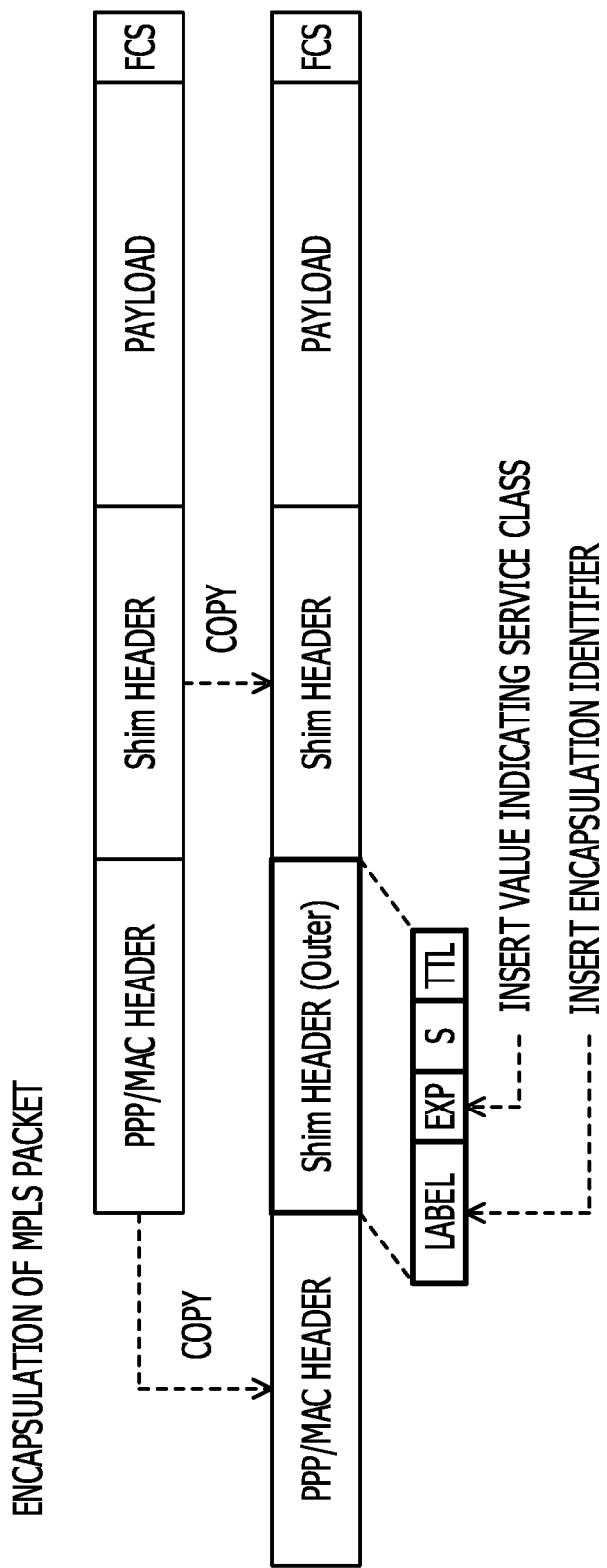
FIG. 12 is a diagram illustrating an example of formats of an MPLS packet before and after encapsulation performed by the input side encapsulation processing section.

FIG. 12 is a diagram illustrating an example of formats of an MPLS packet before and after encapsulation performed by the input side encapsulation processing section 122. In FIG. 12, the upper illustrates the format of the MPLS packet before being encapsulated and the lower illustrates the format of the MPLS packet after being encapsulated.

In the case of the MPLS packet, information indicating a service class is stored in an experimental use (Exp) field in a shim header.

In the case of the MPLS packet, for example, the shim header is inserted between an original PPP/MAC header and the shim header, and thereby encapsulation is performed. An encapsulation shim header includes a label, an experimental use (Exp) field, a bottom of stack (S) field, and a time to live (TTL) field. The value of the encapsulation identification information is stored in the label field in the encapsulation shim header. Information indicating a service class having a free band detected by the input side encapsulation processing section 122 is stored in the Exp field in the encapsulation shim header. Values of the S field and the TTL field in the original shim header are copied and stored in the S field and the TTL field in the encapsulation shim header.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A packet transmission method using at least one of a plurality of service classes executed by a computer among a plurality of computers in a network, the transmission method comprising:

assigning, for each of the plurality of service classes, a value of a maximum transfer band indicating an upper limit of a traffic amount corresponding to the computer;

receiving a packet transferred according to a first service class among the plurality of service classes;

measuring a traffic amount related to the first service class;

determining whether the received packet is encapsulated;

transferring the received packet according to the first service class without encapsulating the received packet, when it is determined that the received packet is encapsulated and when the measured traffic amount is equal to or smaller than the value of the maximum transfer band corresponding to the first service class assigned by the assigning;

determining whether a second service class which is different from the first service class and including a free band, exists among the plurality of service classes, based on the value of the maximum transfer band assigned for each of the plurality of service classes, when the measured traffic amount is more than the value of the maximum transfer band corresponding to the first service class;

encapsulating the received packet using a header including information of the second service class, when it is determined that the second service class exists; and transferring the encapsulated received packet in the second service class.

2. The packet transmission method according to claim 1, further comprising:

causing a header used for encapsulation to include a copy of destination and source of an original header of the received packet and information of the second service class and thus encapsulating the received packet, when the measured traffic amount is greater than or equal to the maximum transfer band corresponding to the first service class.

3. The packet transmission method according to claim 2, further comprising:

determining whether the measured traffic amount is equal to or smaller than the value of the maximum transfer band corresponding to the first service class extracted from an original header of the received packet, when it is determined that the received packet is encapsulated; and deencapsulating the received packet and transferring the deencapsulated received packet according to the first service class, when it is determined that the measured traffic amount is equal to or smaller than the value of the maximum transfer band corresponding to the first service class.

4. The packet transmission method according to claim 3, wherein the computer includes:
a first interface card configured to receive the received packet from the network; and
a second interface card coupled to the first interface card via a switch and configured to transmit the received packet to the network, and
wherein the encapsulating and the decapsulating of the received packet are performed in both of the first interface card and the second interface card.

5. The packet transmission method according to claim 1, further comprising:
discarding the received packet when it is determined that the second service class does not exist.

6. The packet transmission method according to claim 1, wherein the determining includes determining whether the second service class exists when the measured traffic amount becomes more that the value of the maximum transfer band corresponding to the first service class due to movement of at least one of the plurality of mobile terminals.

7. The packet transmission method according to claim 1, further comprising:
extracting information corresponding to the first service class from a header of the received packet.

8. The packet transmission method according to claim 7, wherein the extracting includes extracting the information corresponding to the first service class from a field of priority in a virtual local area network tag of the received packet.

9. The packet transmission method according to claim 1, wherein
the computer includes a plurality of queues configured to store one or more received packets, the plurality of queues respectively corresponding to one of the plurality of service classes, and
the measuring includes measuring a traffic amount of a queue corresponding to the first service class among the plurality of queues.

10. The packet transmission method according to claim 1, wherein the determining whether the second service class exists includes:
detecting a plurality of queues of service classes having the free band; and
selecting, from the service classes related to the plurality of detected queues, a service class to which a highest priority is given as the second service class.

11. The packet transmission method according to claim 1, wherein the determining whether the second service class exists includes:
detecting a plurality of queues of service classes having the free band; and
selecting, from the service classes related to the plurality of detected queues, a service class which has a largest free band as the second service class.

12. A transmission apparatus, comprising:
a memory, and
a processor coupled to the memory and configured to:
assign, for each of a plurality of service classes, a value of a maximum transfer band indicating an upper limit of a traffic amount corresponding to the transmission apparatus;
receive a packet transferred according to a first service class among the plurality of service classes;
measure a traffic amount related to the first service class, based on traffic amount information for each of a plurality of service classes;
determine whether the received packet is encapsulated;
transfer the received packet according to the first service class without encapsulating the received packet, when it is determined that the received packet is encapsulated and when the measured traffic amount is equal to or smaller than a value of a maximum transfer band corresponding to the first service class assigned by the assigning;
determine whether a second service class which is different from the first service class and including a free band exists among the plurality of service classes, based on the value of a maximum transfer band assigned for each of the plurality of service classes, when the measured traffic amount is more than the value of the maximum transfer band corresponding to the first service class;
encapsulate the received packet using a header including information of the second service class, when it is determined that the second service class exists; and
transfer the encapsulated received packet in the second service class.

13. The transmission apparatus according to claim 12, wherein the processor is further configured to:
cause a header used for encapsulation to include a copy of a destination and a source of an original header of the received packet and information of the second service class, when the measured traffic amount is greater than or equal to the maximum transfer band corresponding to the first service class; and
encapsulate the received packet.

14. The transmission apparatus according to claim 13, wherein the processor is further configured to:
deencapsulate the received packet when the received packet is encapsulated and when the transfer band of the first service class is smaller than the value of the maximum transfer band corresponding the first service class.

15. The transmission apparatus according to claim 12, wherein the processor is further configured to:
discard the received packet when it is determined that the second service class does not exist.

16. The transmission apparatus according to claim 12, wherein the processor is further configured to determine whether the second service class exists when the measured traffic amount becomes more than the value of maximum transfer band corresponding to the first service class due to movement of at least one of the plurality of mobile terminals.

17. A non-transitory computer readable storage medium storing a program that causes a computer among a plurality of computers in a network to execute a process, the computer configured to store a value of a maximum transfer band indicating an upper limit of a traffic amount corresponding to the computer, the value being assigned for each of a plurality of service classes, the process comprising:
receiving a packet transferred according to a first service class;
measuring a traffic amount related to the first service class, based on traffic amount information for each of a plurality of service classes;
determining whether the received packet is encapsulated;
transferring the received packet according to the first service class, without encapsulating the received packet, when it is determined that the received packet is encapsulated and when the measured traffic amount is equal to or smaller than a value of the maximum transfer band corresponding to the first service class assigned by the assigning;

determining whether a second service class which is different from the first service class and includes a free band, exists among the plurality of service classes, based on the value of a maximum transfer band assigned for each of the plurality of service classes, when the measured traffic amount is more than the value of the maximum transfer band corresponding to the first service class;

encapsulating the received packet using a header including information of the second service class, when it is determined that the second service class exists; and transferring the encapsulated received packet in the second service class.

* * * * *